US012572096B2

(12) United States Patent
Tanio et al.

(10) Patent No.: US 12,572,096 B2
(45) Date of Patent: Mar. 10, 2026

(54) FIXING DEVICE THAT CAN PREVENT VARIATION OF PRESSURE APPLIED BY A PRESSING ROLLER AND INCLINATION OF A NIP FORMING MEMBER, AND IMAGE FORMING APPARATUS PROVIDED THEREWITH

(71) Applicant: KYOCERA Document Solutions Inc., Osaka (JP)

(72) Inventors: Koji Tanio, Osaka (JP); Seia Fujii, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/970,134

(22) Filed: Dec. 5, 2024

(65) Prior Publication Data

US 2025/0189911 A1 Jun. 12, 2025

(30) Foreign Application Priority Data

Dec. 12, 2023 (JP) ................................ 2023-209491

(51) Int. Cl.
*G03G 15/20* (2006.01)

(52) U.S. Cl.
CPC ..... *G03G 15/2032* (2013.01); *G03G 15/2017* (2013.01); *G03G 15/2064* (2013.01); *G03G 2215/2035* (2013.01)

(58) Field of Classification Search
CPC .......... G03G 15/2017; G03G 15/2064; G03G 15/2032; G03G 15/2053; G03G 2215/2035
USPC .......................... 399/328, 329, 331; 219/216
See application file for complete search history.

(56) References Cited

U.S. PATENT DOCUMENTS

2002/0141796 A1* 10/2002 Nishitani ........... G03G 15/2064 399/328
2011/0170919 A1 7/2011 Fujiwara et al. ............ 399/331
2016/0327900 A1* 11/2016 Tanaka ............... G03G 21/1647
2018/0203386 A1* 7/2018 Hirose ............... G03G 15/2053
2018/0224777 A1* 8/2018 Hashimoto ........ G03G 15/2053
(Continued)

FOREIGN PATENT DOCUMENTS

JP H 06-308851 A 11/1994

OTHER PUBLICATIONS

Extended European Search Report dated Apr. 23, 2025, issued by the European Patent Office in corresponding application EP 24217803.6.

*Primary Examiner* — Robert B Beatty
(74) *Attorney, Agent, or Firm* — Stein IP LLC

(57) ABSTRACT

A fixing device includes a fixing belt, a nip forming member, a pressing roller, a housing, a planer heater, a pair of belt holders, and a pressing mechanism. The pressing mechanism has a pair of pressing springs that urge the pair of belt holders toward the pressing roller, and a pair of pressing plates that are arranged opposite the pair of belt holders and swing toward or away from the belt holder. The pressing mechanism swings the pressing plate to adjust the urging force of the pressing spring. The pressing springs are compression coil springs and their diameter is larger than the width-direction length of the planer heater, which is the same as the rotation direction of the fixing belt, and the central axis of the pressing spring coincides with a straight line passing through the rotation centers of the fixing belt and the pressing roller.

2 Claims, 6 Drawing Sheets

(56) References Cited

U.S. PATENT DOCUMENTS

| | | | | |
|---|---|---|---|---|
| 2019/0033762 | A1* | 1/2019 | Ikegami | G03G 15/206 |
| 2020/0387097 | A1* | 12/2020 | Obata | G03G 15/2064 |
| 2023/0305457 | A1 | 9/2023 | Someya et al. | G03G 15/2028 |
| 2025/0189912 | A1* | 6/2025 | Tanio | G03G 21/1647 |

* cited by examiner

FIXING DEVICE THAT CAN PREVENT VARIATION OF PRESSURE APPLIED BY A PRESSING ROLLER AND INCLINATION OF A NIP FORMING MEMBER, AND IMAGE FORMING APPARATUS PROVIDED THEREWITH

INCORPORATION BY REFERENCE

This application is based on and claims the benefit of priority from Japanese Patent Application No. 2023-209491 filed on Dec. 12, 2023, the contents of which are hereby incorporated by reference.

BACKGROUND

The present disclosure relates to fixing devices incorporated in image forming apparatuses such as copiers, printers, facsimile machines, and multifunction peripherals having their functions integrated together, and to image forming apparatuses provided with such a fixing device.

In electrophotographic type image forming apparatuses, to fix a toner image to a sheet, wide use is made of a fixing device including a fixing member configured with a fixing roller or a fixing belt (a heated rotating member) and a pressing roller (a pressing rotating member) kept in pressed contact with each other. This fixing device passes the sheet through a fixing nip portion formed between the fixing roller or the fixing belt and the pressing roller, and heats and presses the toner image to fuse and fix the toner image to the sheet.

In the fixing device described above, the heated rotating member and the pressing rotating member need to be kept in pressed contact with each other with a predetermined pressure.

SUMMARY

According to one aspect of the present disclosure, a fixing device includes an endless fixing belt, a nip forming member, a pressing roller, a housing, a planer heater, a pair of belt holders, and a pressing mechanism, and while the fixing belt and the pressing roller are rotating, the fixing device heats and presses a sheet passing through the fixing nip portion to fuse and fix an unfixed toner image to the sheet. The nip forming member is arranged opposite the inner circumferential surface of the fixing belt. The pressing roller is kept in pressed contact with the nip forming member through the fixing belt to form a fixing nip portion with the fixing belt. The housing houses the fixing belt, the nip forming member, and the pressing roller. The planer heater is arranged on the surface of the nip forming member facing the fixing belt, and heats the fixing belt. The pair of belt holders holds opposite ends of the fixing belt and of the nip forming member. The pressing mechanism adjusts the pressure between the fixing belt and the pressing roller. The pressing mechanism has a pair of pressing springs that respectively urge the pair of belt holders in a direction toward the pressing roller, and a pair of pressing plates that are respectively arranged opposite the pair of belt holders and that swing in the direction toward or away from the belt holder. The pressing mechanism swings the pressing plate to adjust the urging force of the pressing spring. The pressing springs are compression coil springs and their diameter is larger than the length of the planer heater in its width direction, which is the same as the rotation direction of the fixing belt. The central axis of the pressing spring is arranged to coincide with a straight line passing through the rotation center of the fixing belt and the rotation center of the pressing roller.

DETAILED DESCRIPTION

Figure 1:
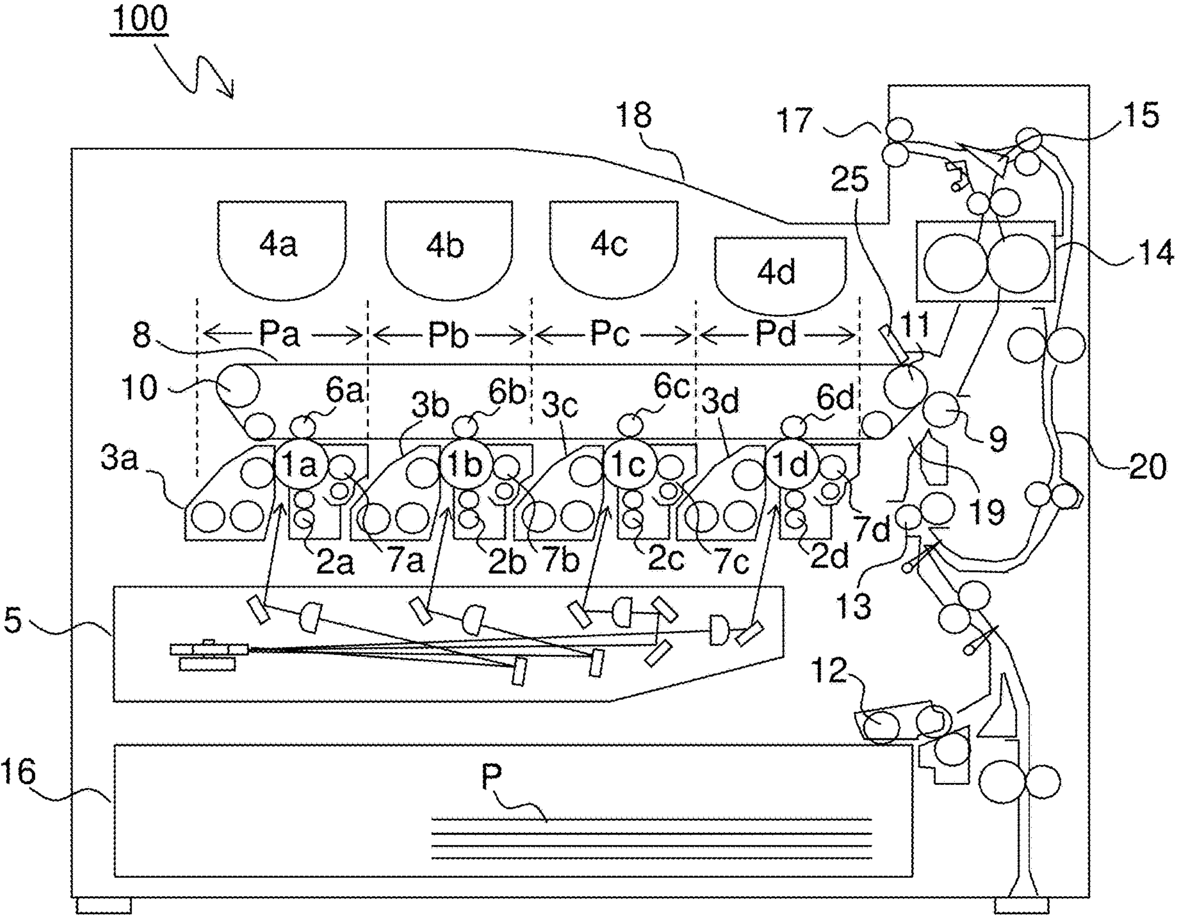
FIG. 1 is a schematic sectional view showing the overall construction of an image forming apparatus according to an embodiment of the present disclosure.

Hereinafter, an embodiment of the present disclosure will be described with reference to the drawings. FIG. 1 is a sectional view showing the internal construction of an image forming apparatus 100 according to an embodiment of the present disclosure. In a main body of the image forming apparatus 100 (here, a color printer), four image forming portions Pa, Pb, Pc, and Pd are arranged in this order from upstream (the left side in FIG. 1) in the conveyance direction. The image forming portions Pa to Pd are provided so as to correspond to images of four different colors (yellow, cyan, magenta, and black). The image forming portions Pa to Pd form yellow, cyan, magenta, and black images sequentially, each through the processes of electrostatic charging, exposure to light, image development, and image transfer.

In these image forming portions Pa to Pd are arranged photosensitive drums (image carrying member) 1*a*, 1*b*, 1*c*, and 1*d*, which carry visible images (toner images) of the different colors. An intermediate transfer belt (intermediate transfer member) 8 that rotates counterclockwise in FIG. 1 by being driven by a belt driving motor (not illustrated) is provided adjacent to the image forming portions Pa to Pd. The toner images formed on the photosensitive drums 1*a* to 1*d* are, by being primarily transferred sequentially to the intermediate transfer belt 8, which moves while in contact with the photosensitive drums 1*a* to 1*d*, overlaid on each other. Thereafter, the toner images primarily transferred to the intermediate transfer belt 8 are secondarily transferred by a secondary transfer roller 9 to a transfer sheet P as one example of a recording medium. The transfer sheet P having the toner images secondarily transferred to it then has the toner images fixed to it in a fixing device 14 and is then discharged out of the main body of the image forming apparatus 100. While the photosensitive drums 1*a* to 1*d* are rotated clockwise in FIG. 1, an image forming process is performed with respect to the photosensitive drums 1*a* to 1*d*.

The transfer sheets P to which toner images will be secondarily transferred are stored inside a sheet cassette 16 arranged in a lower part of the main body of the image forming apparatus 100. The transfer sheet P is conveyed via a sheet feed roller 12 and a pair of registration rollers 13 along a sheet conveyance passage 19 to the nip between the secondary transfer roller 9 and a driving roller 11 for the intermediate transfer belt 8. Used as the intermediate transfer belt 8 is a sheet of a dielectric resin, typically a belt with no seam (a seamless belt). Downstream of the secondary transfer roller 9, a blade-form belt cleaner 25 for removing toner and the like left on the surface of the intermediate transfer belt 8 is provided.

Next, the image forming portions Pa to Pd will be described. Around and under the photosensitive drums 1*a* to 1*d*, which are rotatably arranged, there are provided charging devices 2*a*, 2*b*, 2*c*, and 2*d* which electrostatically charge the photosensitive drums 1*a* to 1*d*, an exposure device 5 which exposes the photosensitive drums 1*a* to 1*d* to light conveying image information, developing device 3*a*, 3*b*, 3*c*, and 3*d* which form toner images on the photosensitive drums 1*a* to 1*d*, and cleaning devices 7*a*, 7*b*, 7*c*, and 7*d* which remove developer (toner) and the like left on the photosensitive drums 1*a* to 1*d*.

When image data is fed in from a host device such as a personal computer, first, the charging devices 2*a* to 2*d* electrostatically charge the surfaces of the photosensitive drums 1*a* to 1*d* uniformly. Next, the exposure device 5 irradiates the photosensitive drums 1*a* to 1*d* with light according to image data to form on them electrostatic latent images according to the image data. The development devices 3*a* to 3*d* are loaded with predetermined amounts of two-component developer containing toner of different colors, namely yellow, cyan, magenta, and black respectively. When, as image formation proceeds as will be described later, the proportion of the toner in the two-component developer in the development devices 3*a* to 3*d* falls below a prescribed value, toner is supplied from toner containers 4*a* to 4*d* to the development devices 3*a* to 3*d*. The toner in the developer is fed from the development devices 3*a* to 3*d* to the photosensitive drums 1*a* to 1*d* and electrostatically adhere to them. Thus, toner images are formed according to the electrostatic latent images formed by exposure to light from the exposure device 5.

Then, primary transfer rollers 6*a* to 6*d* apply an electric field at a predetermined transfer voltage between the primary transfer rollers 6*a* to 6*d* and the photosensitive drums 1*a* to 1*d*, and thereby the yellow, cyan, magenta, and black toner images on the photosensitive drums 1*a* to 1*d* are primarily transferred to the intermediate transfer belt 8. These images are formed with a predetermined positional relationship. After that, in preparation for the subsequent formation of new electrostatic latent images, the toner and the like remaining on the surfaces of photosensitive drums 1*a* to 1*d* after primary transfer are removed by cleaning devices 7*a* to 7*d*.

The intermediate transfer belt 8 is wound around a driven roller 10, arranged upstream, and the driving roller 11, arranged downstream. As the driving roller 11 is rotated by the belt driving motor (not illustrated), the intermediate transfer belt 8 starts rotating counterclockwise, and the transfer sheet P is conveyed with predetermined timing from the pair of registration rollers 13 to a secondary transfer nip portion N1 (see FIG. 2) between the driving roller 11 and the secondary transfer roller 9 provided next to it. The toner images formed on the intermediate transfer belt 8 are secondarily transferred to the transfer sheet P passing through the secondary transfer nip portion N1.

The transfer sheet P having the toner images secondarily transferred to it is conveyed to the fixing device 14. The fixing device 14 has a fixing belt 14*a* and a pressing roller 14*b* (see FIG. 2 for both). The fixing belt 14*a* is heated with a planer heater 43 (see FIG. 8). The pressing roller 14*b* is kept in pressed contact with the fixing belt 14*a* to form a fixing nip N2 (see FIG. 5) and applies a rotational driving force to the fixing belt 14*a*.

The transfer sheet P conveyed to the fixing device 14 is heated and pressed by the fixing belt 14*a* and the pressing roller 14*b*; thus the toner images are fixed to the surface of the transfer sheet P and a predetermined full-color image is formed. The transfer sheet P with the full-color image formed on it is conveyed via a pair of fixing discharge rollers 24 (see FIG. 2) and then has its conveyance direction switched by a branch portion 15 that branches into a plurality of directions so as to be discharged as it is (or after being diverted to a duplex conveyance passage 20 to have images formed on both sides) to a discharge tray 18 by a pair of discharge rollers 17.

Figure 2:
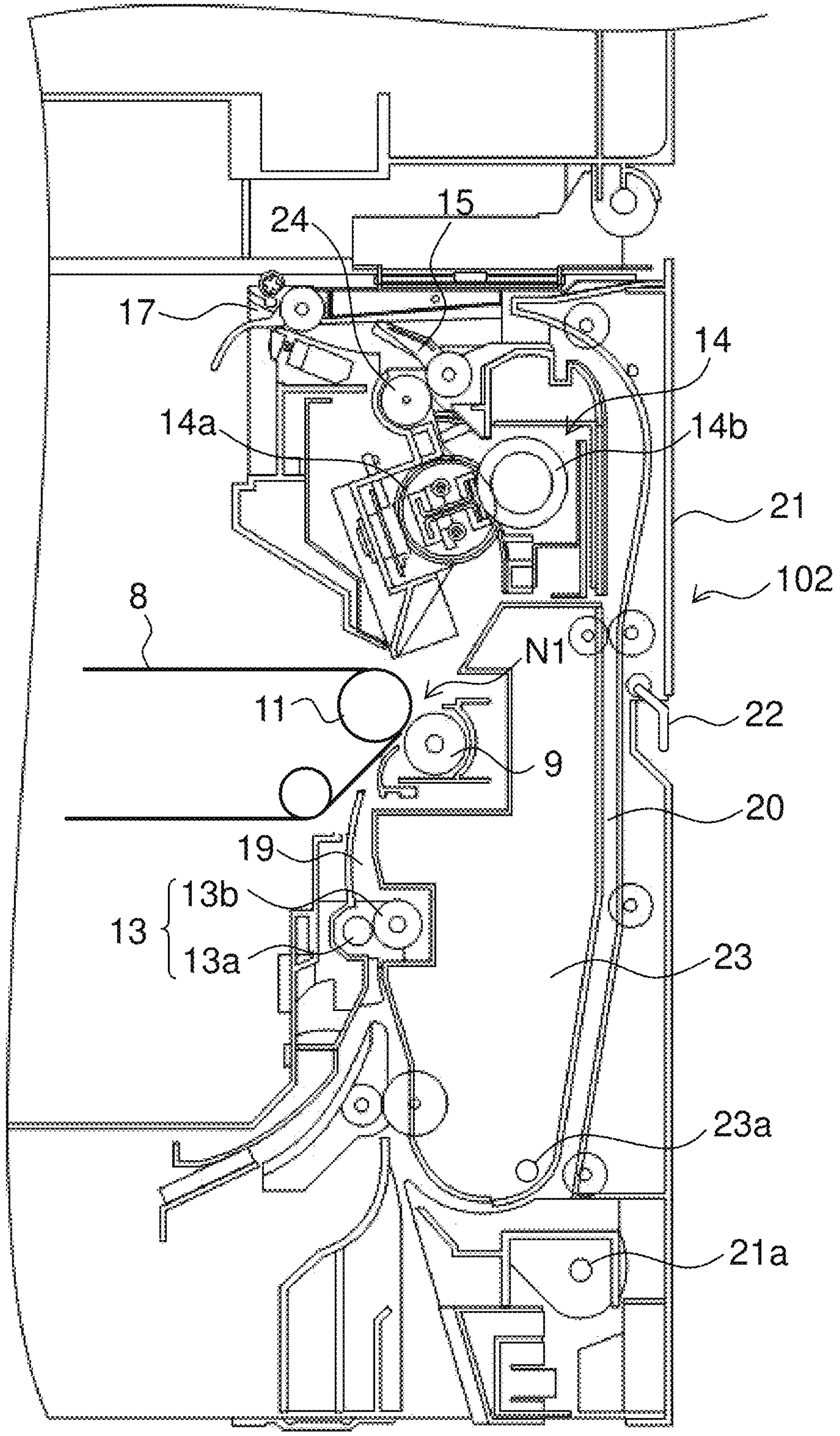
FIG. 2 is a sectional part view around a sheet conveyance passage and a duplex conveyance passage in the image forming apparatus according to the embodiment.

FIG. 2 is a sectional part view around the sheet conveyance passage 19 and the duplex conveyance passage 20 in the image forming apparatus 100 according to this embodiment. An open/close cover 21 constitutes part of a side face 102 of the image forming apparatus 100 and is pivotably supported on a cover shaft 21*a* provided in the lower part of the main body of the image forming apparatus 100. The inner side face of the open/close cover 21 constitutes part of one (outside) of the conveyance faces of the duplex conveyance passage 20.

The side face of the open/close cover 21 is provided with a grip portion 22. The grip portion 22 keeps the open/close cover 21 closed with one end part of the grip portion 22 engaging with engagement pins (not illustrated) provided on a front frame and a rear frame of the main body of the image forming apparatus 100. To open the open/closed cover 21, the grip portion 22 is pivoted to disengage from the engagement pins.

Inward of the open/close cover 21 is arranged a conveyance unit 23. The conveyance unit 23 is supported on the main body of the image forming apparatus 100 so as to be pivotable about a unit shaft 23*a* and the conveyance unit 23 constitutes part of the conveyance face of the duplex conveyance passage 20 and the sheet conveyance passage 19. The duplex conveyance passage 20 extends between the inner side surface of the open/close cover 21 and the outer side surface of the conveyance unit 23 along the side face 102 of the image forming apparatus 100 in the up-down direction, then curves substantially in a C-shape to join the sheet conveyance passage 19. The inner side surface of the conveyance unit 23 is fitted with, in order from upstream (bottom in FIG. 2) in the conveyance direction of the transfer sheet P, a one-side roller 13*b*, which constitutes the pair of registration rollers 13, and the secondary transfer roller 9.

As the open/close cover 21 alone is pivoted to open in the opening direction with respect to the image forming apparatus 100, the duplex conveyance passage 20 is exposed over a wide range. As the open/close cover 21 is pivoted together with the conveyance unit 23 in the opening direction, the conveyance unit 23 moves away from the main body of the image forming apparatus 100 and the sheet conveyance passage 19 is exposed over a wide range. By contrast, as the open/close cover 21 is pivoted together with the conveyance unit 23 to close in the closing direction, the conveyance unit 23 makes contact with the main body of the image forming apparatus 100, the secondary transfer roller 9 is pressed against the driving roller 11 with the intermediate transfer belt 8 in between to form a secondary transfer nip N1.

Figure 3:
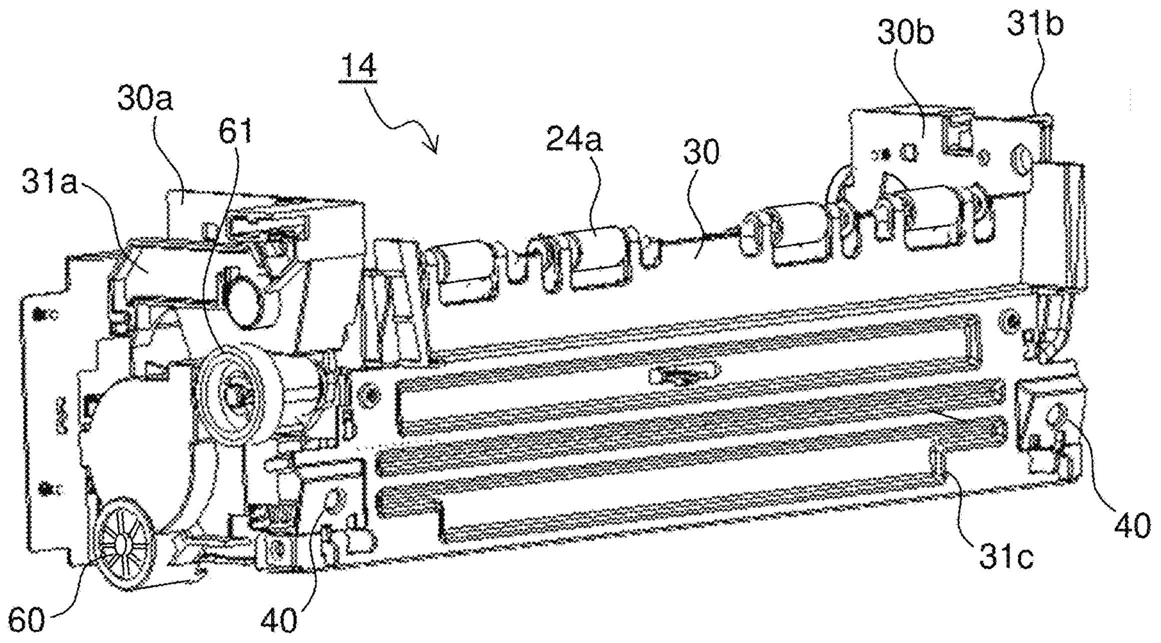
FIG. 3 is a perspective view of a fixing device as seen from downstream in the discharging direction of a transfer sheet P from the image forming apparatus.
Figure 4:
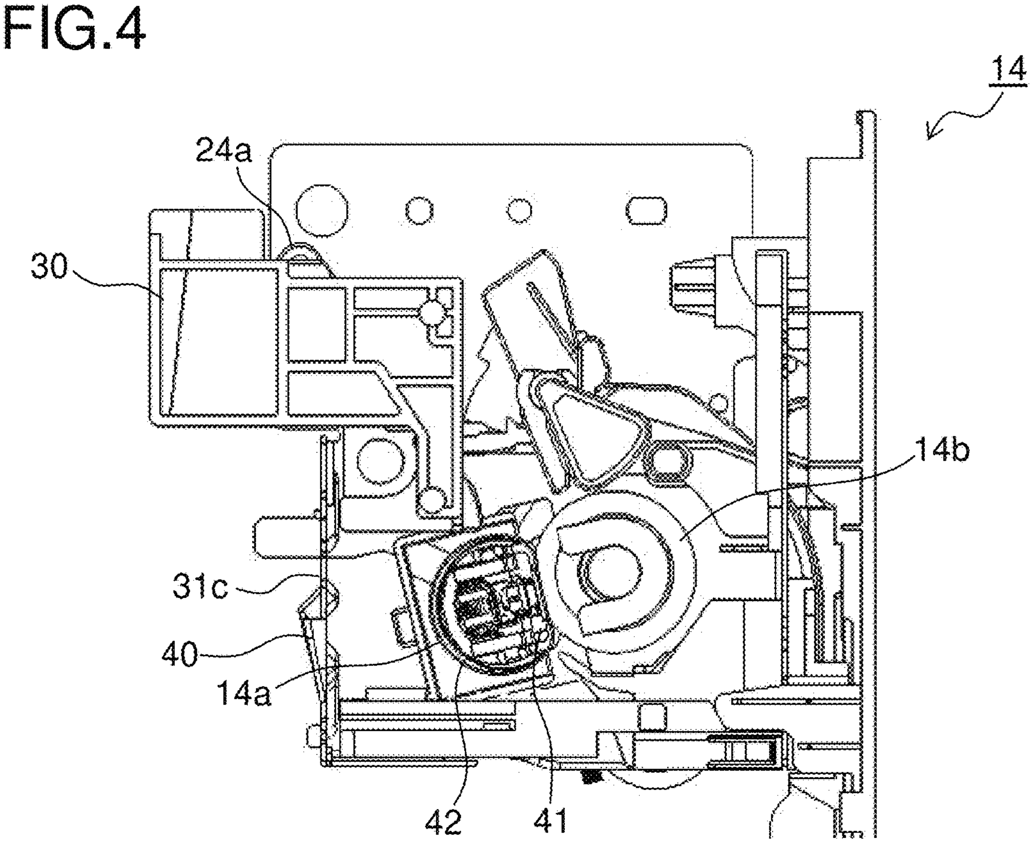
FIG. 4 is a side sectional view of the fixing device as cut at its middle in the longitudinal direction.

Next, the configuration of the fixing device 14 will be described. FIG. 3 is a perspective view, as seen from the downstream side (left side in FIG. 2) in the discharging direction of the transfer sheet P from the image forming apparatus 100, of the fixing device 14. FIG. 4 is a side sectional view of the fixing device 14 as cut at its middle in the longitudinal direction.

The fixing device 14 has a housing 30, side covers 31*a* and 31*b*, and a stay 31*c*. The housing 30 houses the fixing belt 14*a* and the pressing roller 14*b*. Above the housing 30 is supported one-side (left side in FIG. 2) roller 24*a* constituting the pair of fixing discharge rollers 24.

The side covers 31*a* and 31*b* are fixed to side plates 30*a* and 30*b* arranged at the opposite ends of the housing 30 in the longitudinal direction. The stay 31*c* is made of metal and is a plate-form member fixed to the housing 30 along the longitudinal direction. At the opposite ends of the stay 31*c* in the longitudinal direction, a pair of spring brackets 40 are formed, each to support one end (lower end) of a pressing spring 35 (see FIG. 5) of a pressing mechanism 32.

At the side cover 31*a* side, there are arranged a driving input gear 60 and a depressurizing gear 61. The driving input gear 60 meshes with a roller driving gear (not illustrated) fixed to a rotation shaft 141 of the pressing roller 14*b*. When a rotational driving force is transmitted from a fixing driving motor (not illustrated) via a driving output gear (not illustrated) on the main body of the image forming apparatus 100 to the driving input gear 60, the pressing roller 14*b* rotates at a predetermined speed. Thus, the fixing belt 14*a* kept in pressed contact with the fixing roller 14*b* also rotates by following the pressing roller 14*b*.

Inside the fixing belt 14*a* are arranged a nip forming member 41 and a belt guide 42. The nip forming member 41 makes contact with the pressing roller 14*b* via the fixing belt 14*a* to form a fixing nip portion N2 (see FIG. 5) through which the transfer sheet P is inserted. The nip forming member 41 is made of a heat-resistant resin such as a liquid crystal polymer or an elastic material such as silicone rubber and an elastomer may be arranged on the surface facing the fixing belt 14*a* for enhanced sliding properties.

The belt guide 42 is in the shape of an arc in a sectional view and makes contact with the inner circumferential surface of the fixing belt 14*a* except on the surface facing the nip forming member 41. The belt guide 42 applies a predetermined tension to the fixing belt 14*a* and holds the fixing belt 14*a* in the shape of an arc from inside it. The belt guide 42 is formed of a metal plate that extends along the axial direction of the fixing belt 14*a* over substantially the same length as the fixing belt 14*a*.

Figure 5:
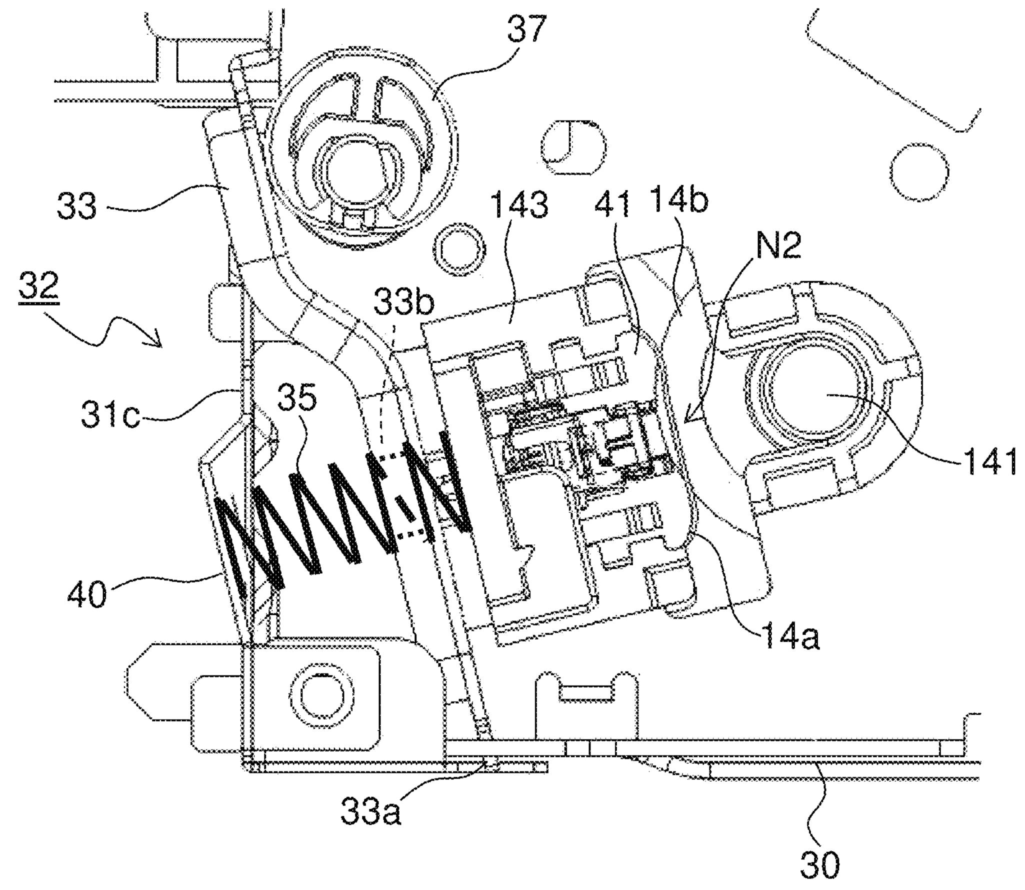
FIG. 5 is a side sectional view of the fixing device as cut at an end part of its in the longitudinal direction.

FIG. 5 is a side sectional view of the fixing device 14 as cut in an end part (a right end part in FIG. 3) of it in the longitudinal direction. At the opposite ends of the fixing device 14 in the longitudinal direction, the pressing mechanism 32 is arranged to adjust the pressure between the fixing belt 14*a* and the pressing roller 14*b*. A pair of pressing mechanisms 32 are provided at the opposite ends of the fixing belt 14*a* and the pressing roller 14*b* in the axial direction. A pair of pressing mechanisms 32 each have a pressing plate 33, a pressing spring 35, and an eccentric cam 37.

The pressing plate 33 is arranged opposite a belt holder 143 that supports the opposite ends of the fixing belt 14*a*, the nip forming member 41, and the belt guide 42 in the longitudinal direction. The pressing plate 33 has a fulcrum portion 33*a* supported on the housing 30 (see FIG. 3) of the fixing device 14 and is swingable in directions toward and away from the belt holder 143.

The pressing spring 35 is a compression coil spring and urges the belt holder 143 in a direction toward the pressing roller 14*b*. Specifically, one end of the pressing spring 35 is supported in the spring bracket 40 formed in the stay 31*c*. The other end of the pressing spring 35 is fitted around a second positioning boss 143*a* (see FIG. 9) on the belt holder 143 that projects through a through-hole 33*b* formed in the pressing plate 33 and is in contact with the pressing plate 33. The inner diameter of the through-hole 33*b* is smaller than the outer diameter of the pressing spring 35 and as the pressing plate 33 swings, the pressing spring 35 expands and contracts between the pressing plate 33 and the spring bracket 40.

The eccentric cam 37 is arranged at the same side (right side in FIG. 5) as the belt holder 143 with respect to the pressing plate 33. The eccentric cam 37 is formed integrally with the depressurizing gear 61 (see FIG. 3) that feeds the driving force to the pressing mechanism 32. As the eccentric cam 37 rotates together with the depressurizing gear 61, a change occurs in the outer diameter of the eccentric cam 37 that makes contact with the pressing plate 33.

Figure 6:
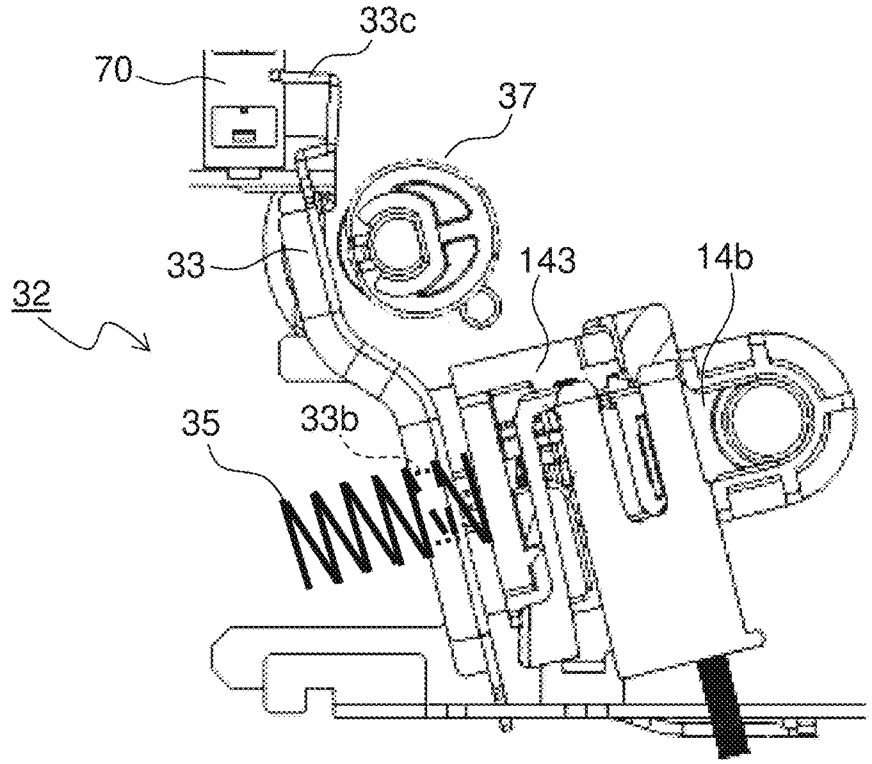
FIG. 6 is a side view showing a state pressurized by the pressing mechanism.
Figure 7:
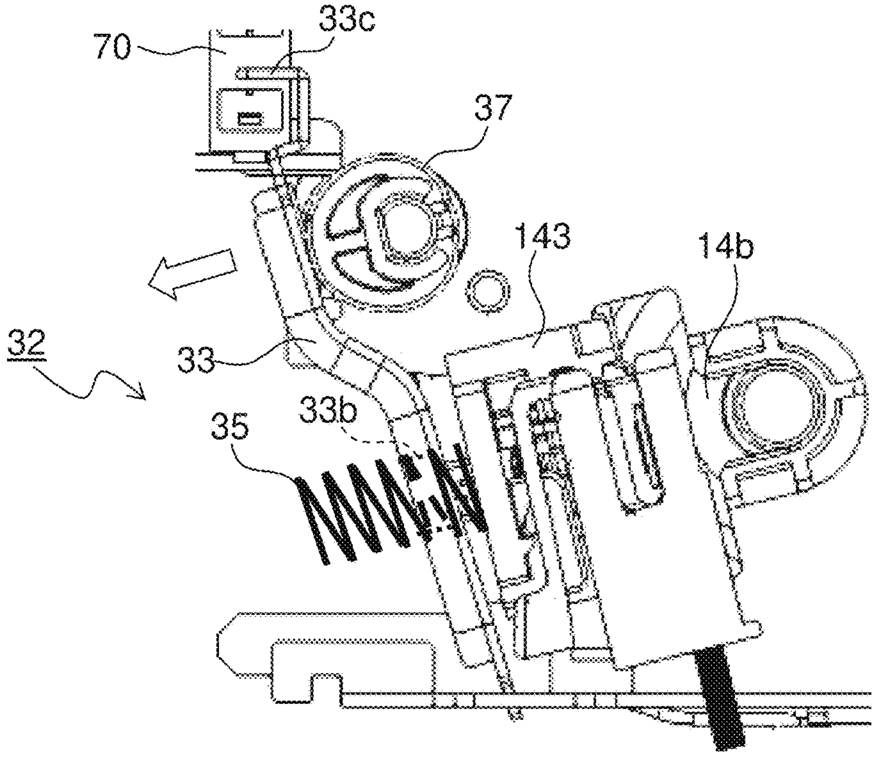
FIG. 7 is a side view showing a state depressurized by the pressing mechanism.

FIGS. 6 and 7 are side views showing a pressurized state and a depressurized state, respectively, of the pressing mechanism 32. As shown in FIG. 6, when a small-diameter portion of the eccentric cam 37 faces the pressing plate 33, the urging force of the pressing spring 35 causes a constant pressure to act on the belt holder 143. Thus, the pressing roller 14*b* is kept in pressed contact with the nip forming member 41 to form the fixing nip N2 (see FIG. 5) with the fixing belt 14*a*. In the state in FIG. 6, a light-shielding portion 33*c* formed on the swinging end of the pressing plate 33 is retracted from a sensing portion of a PI sensor 70 and the PI sensor 70 senses the pressurized state.

When the eccentric cam 37 rotates by a predetermined amount from the state in FIG. 6 and, as shown in FIG. 7, a large-diameter portion of the eccentric cam 37 makes contact with the pressing plate 33, the pressing plate 33 is pressed against the urging force of the pressing spring 35 in a direction away from the belt holder 143. As a result, the pressing spring 35 is compressed between the pressing plate 33 and the spring bracket 40 and the pressure acting from the pressing plate 33 to the belt holder 143 is weakened. In the state in FIG. 7, the light-shielding portion 33*c* shields from light the sensing portion of the PI sensor 70 and the PI sensor 70 senses the depressurized state.

Figure 8:
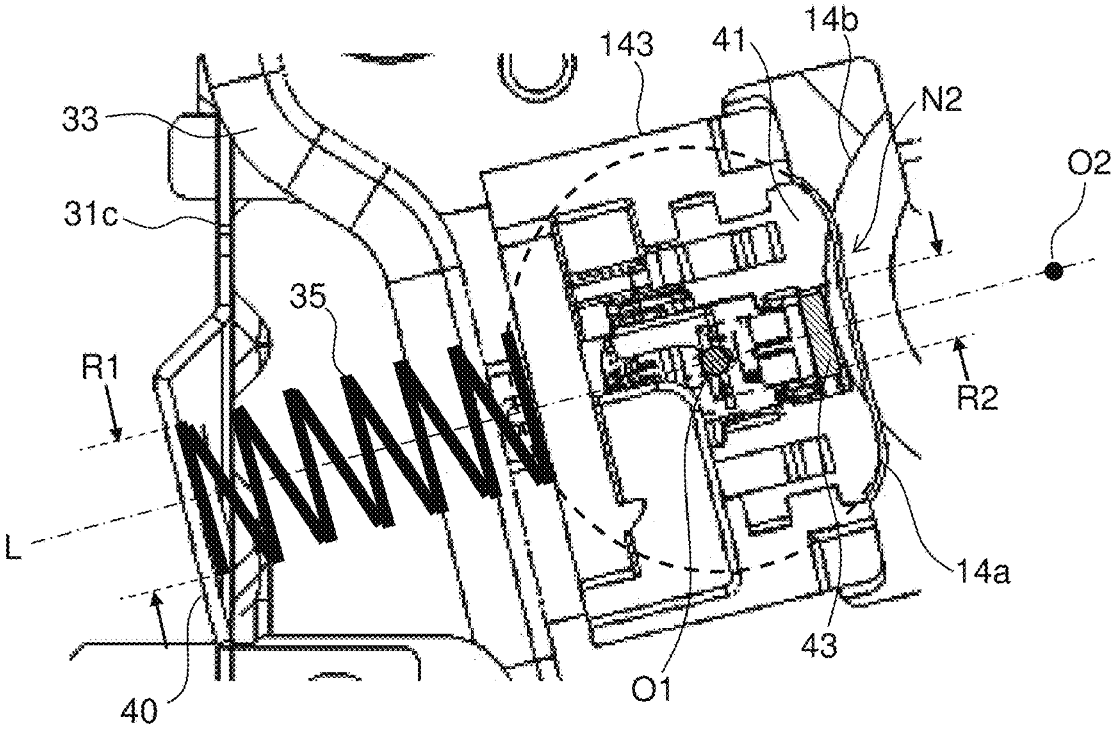
FIG. 8 is an enlarged part view around a belt holder and a pressing spring in FIG. 5.

FIG. 8 is an enlarged part view around the belt holder 143 and the pressing spring 35 in FIG. 5. As shown in FIG. 8, the pressing spring 35 is arranged on a straight line L passing through the rotation center O1 of the fixing belt 14*a* and the rotation center O2 of the pressing roller 14*b*. Specifically, the pressing spring 35, which is a compression coil spring, is arranged so that its center line in the axial direction (contraction direction) of the pressing spring 35 coincides with the straight line L.

The pressing direction required between the fixing belt 14*a* and the pressing roller 14*b* is a direction perpendicular to the fixing nip portion N2 between the fixing belt 14*a* and the pressing roller 14*b*, that is, the direction of the straight line L connecting the rotation centers of the fixing belt 14*a* and the pressing roller 14*b*.

Arranging the pressing spring 35 as described above permits the required load (pressure) to be applied in the required pressing direction (the direction of the straight line L). It is thus possible to prevent the variation of the pressure applied by the pressing mechanism 32 and the inclination of the nip forming member 41.

On the nip forming member 41, on its surface facing the pressing roller 14*b*, the planer heater 43 is arranged. The planer heater 43 extends, with a predetermined width R2, over substantially the entire range of the fixing belt 14*a* along its rotation axis direction (width direction). The planer heater 43 is a heating member that heats the fixing belt 14*a* to a fixing temperature.

In this embodiment, the pressing spring 35 is given a diameter R1 larger than the width R2 of the planer heater 43. It is thus possible to apply the pressure to the planer heater 43 uniformly in the width direction and to prevent the inclination of the planer heater 43 with respect to the fixing nip portion.

Figure 9:
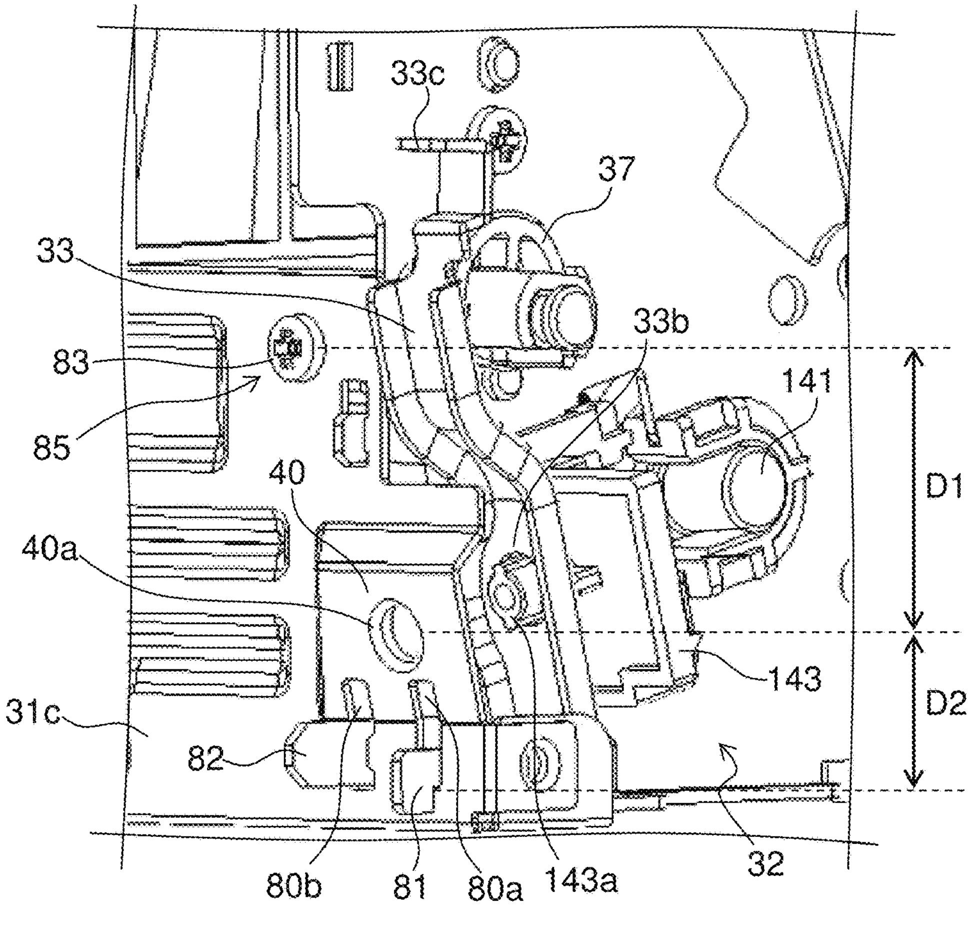
FIG. 9 is a perspective view of the construction around the pressing mechanism as seen from the stay.

FIG. 9 is a perspective view of the construction around the pressing mechanism 32 as seen from the stay 31*c*. While FIG. 9 shows the pressing mechanism 32 at one end (right side in FIG. 3) of the fixing device 14, the pressing mechanism 32 at the other end (left side in FIG. 3) of the fixing device 14 is similarly configured except being symmetrical left to right.

As shown in FIG. 9, the spring bracket 40 has formed on it a first positioning boss 40*a* for positioning one end of the pressing spring 35 (see FIG. 8). The belt holder 143 has formed on it a second positioning boss 143*a* for positioning the other end of the pressing spring 35.

Inserting the first and second positioning bosses 40*a* and 143*a* in opposite ends of the pressing spring 35 results in, as shown in FIG. 8, the pressing spring 35 being arranged such that its center line in the axial direction coincides with the straight line L.

Below the spring bracket 40 in the stay 31*c*, slits 80*a* and 80*b* are formed. The slits 80*a* and 80*b* are engaged with a hook portion 81 and a unit positioning projection 82, respectively, on the housing 30. The hook portion 81 engages with the slit 80*a* to couple together the lower end of the stay 31*c* and the housing 30. The unit positioning projection 82 engages with a positioning hole (not illustrated) in the main body of the image forming apparatus 100 when the fixing device 14 is inserted in the main body of the image forming apparatus 100 to position the fixing device 14 relative to the main body of the image forming apparatus 100.

When the stay 31*c* is fitted to the housing 30, first, the first positioning boss 40*a* is inserted in one end of the pressing spring 35. In this state, the slits 80*a* and 80*b* are engaged with the hook portion 81 and the unit positioning projection 82 on the housing 30. Then, while the pressing spring 35 is compressed, the stay 31*c* swung in a direction toward the housing 30 with the lower end of the stay 31*c* as a fulcrum.

After that, in a state in which a top part of the stay 31*c* is in contact with the housing 30, a screw 83 is fastened to a screw hole (not illustrated) formed in the stay 31*c*. The procedure described above is performed at both ends of the stay 31*c* in the longitudinal direction to complete the fitting of the stay 31*c*.

With this embodiment, the spring bracket 40 is provided in the stay 31*c* of the fixing device 14 and this helps reduce the number of components and assembly man-hours than with the configuration in which the spring bracket 40 is a separate member and thereby reduce the cost of the fixing device 14.

The distance D1 from the spring bracket 40 (the first positioning boss 40*a*) to a screw fastening portion 85 is larger than the distance D2 from the engaging position of the slit 80*a* with the hook portion 81 to the spring bracket 40 (the first positioning boss 40*a*). Thus, when the stay 31*c* is swung, the pressing spring 35 can be compressed with a weak force by the principle of leverage. It is thus possible to smoothly perform the fitting of the stay 31*c* and to enhance the ease of assembly of the fixing device 14.

The present disclosure is not limited to the above embodiment and can be carried out with any modifications made without departure from the spirit of the present disclosure. For example, in the above embodiment, the slit 80*a* is provided below the spring bracket 40 in the stay 31*c* and the hook portion 81 is provided on the housing 30; instead, the hook portion 81 may be provided on the stay 31*c* and the slit 80*a* may be provided in the housing 30.

While the embodiment described above deals with, as an example of an image forming apparatus 100, a color printer as shown in FIG. 1, the present disclosure is applicable not only to color printers but also to any image forming apparatuses including a fixing device, such as color copiers, color multifunction peripherals, monochrome printers, and monochrome copiers.

The present disclosure finds applications in fixing devices incorporated in image forming apparatuses such as copiers, printers, facsimile machines, and multifunction peripherals having their functions integrated together. Based on the present disclosure, in a belt-fixing system, it is possible to provide a fixing device that can keep constant the pressure at a fixing nip portion between a fixing belt and a pressing roller with a simple configuration, and to provide an image forming apparatus provided with such a fixing device.

What is claimed is:

1. A fixing device comprising:

an endless fixing belt;

a nip forming member that is arranged opposite an inner circumferential surface of the fixing belt;

a pressing roller that is kept in pressed contact with the nip forming member through the fixing belt to form a fixing nip portion with the fixing belt;

a housing that houses the fixing belt, the nip forming member, and the pressing roller;

a planer heater that is arranged on a surface of the nip forming member facing the fixing belt, the planer heater heating the fixing belt;

a pair of belt holders that holds opposite ends of the fixing belt and of the nip forming member; and a pressing mechanism that adjusts pressure between the fixing belt and the pressing roller, wherein the pressing mechanism has a pair of pressing springs that respectively urge the pair of belt holders in a direction toward the pressing roller, and a pair of pressing plates that are respectively arranged opposite the pair of belt holders, the pair of pressing plates swinging in a direction toward or away from the belt holder the pressing mechanism swings the pressing plates to adjust an urging force of the pressing springs, the pressing springs are compression coil springs and a diameter of the pressing springs is larger than a length of the planer heater in a width direction thereof, which is a same direction as a rotation direction of the fixing belt, a central axis of the pressing springs is arranged to coincide with a straight line passing through a rotation center of the fixing belt and a rotation center of the pressing roller, while the fixing belt and the pressing roller are rotating, the fixing device heats and presses a sheet passing through the fixing nip portion to fuse and fix an unfixed toner image on the sheet, on the housing, a stay which is made of metal is fixed along a longitudinal direction, at opposite ends of the stay in the longitudinal direction, a pair of spring brackets are formed to support end parts of the pair of pressing springs opposite to the belt holder, the stay, at the opposite ends in the longitudinal direction, has a pair of engagement portions formed at one side in a direction orthogonal to the longitudinal direction, the pair of engagement portions engaging with engaged portions formed on the housing, and a pair of screw fastening portions formed at another side in the direction orthogonal to the longitudinal direction, the pair of screw fastening portions being fastened to the housing with a screw, and a distance from the spring bracket portion to the screw fastening portion at one end of the stay in the longitudinal direction is larger than a distance from the spring bracket portion to the engagement portion.

2. An image forming apparatus comprising:

an image forming portion that forms a toner image on a sheet and the fixing device according to claim 1 that heats and presses the sheet having the toner image formed by the image forming portion, to fix the toner image to the sheet.

* * * * *